United States Patent
Takatori et al.

(10) Patent No.: US 7,386,714 B2
(45) Date of Patent: Jun. 10, 2008

(54) TRANSMITTING DATA FROM A SINGLE STORAGE UNIT BETWEEN MULTIPLE PROCESSORS DURING BOOTING

(75) Inventors: Tsuyoshi Takatori, Hyogo (JP); Shinji Yamashita, Hyogo (JP); Hiroaki Sakamoto, Hyogo (JP)

(73) Assignee: Fujitsu Ten Limited, Hyogo (JP)

( * ) Notice: Subject to any disclaimer, the term of this patent is extended or adjusted under 35 U.S.C. 154(b) by 519 days.

(21) Appl. No.: 10/983,713

(22) Filed: Nov. 9, 2004

(65) Prior Publication Data

US 2005/0120281 A1 Jun. 2, 2005

(30) Foreign Application Priority Data

Nov. 19, 2003 (JP) .............................. 2003-389599

(51) Int. Cl.
*G06F 9/00* (2006.01)
*G06F 15/177* (2006.01)
(52) U.S. Cl. .............................. 713/2; 709/212; 712/28
(58) Field of Classification Search .................... 713/2; 712/28, 31; 709/205
See application file for complete search history.

(56) References Cited

U.S. PATENT DOCUMENTS

| | | | | |
|---|---|---|---|---|
| 6,012,142 | A * | 1/2000 | Dokic et al. ..................... | 713/2 |
| 6,453,391 | B2 * | 9/2002 | Morita et al. ................ | 711/141 |
| 6,961,826 | B2 * | 11/2005 | Garnett et al. ............... | 711/144 |
| 7,149,609 | B2 * | 12/2006 | Hashimoto ..................... | 701/1 |
| 2005/0008011 | A1 * | 1/2005 | Georgiou et al. ........... | 370/389 |

FOREIGN PATENT DOCUMENTS

| | | |
|---|---|---|
| JP | A 63-208905 | 8/1988 |
| JP | A 64-038802 | 2/1989 |
| JP | A 5-289979 | 11/1993 |
| JP | A 6-292274 | 10/1994 |
| JP | A 6-311169 | 11/1994 |
| JP | A 7-284159 | 10/1995 |
| JP | A 8-87481 | 4/1996 |
| JP | A 8-102980 | 4/1996 |
| JP | A 2001-282758 | 10/2001 |
| JP | A 2002-024101 | 1/2002 |
| JP | A 2002-99517 | 4/2002 |
| JP | A 2002-312334 | 10/2002 |
| JP | A 2002-317687 | 10/2002 |
| JP | A 2003-36251 | 2/2003 |
| JP | A 2003-48345 | 2/2003 |
| JP | A 2003-214224 | 7/2003 |

* cited by examiner

*Primary Examiner*—Thomas Lee
*Assistant Examiner*—Jaweed A Abbaszadeh
(74) *Attorney, Agent, or Firm*—Oliff & Berridge, PLC

(57) ABSTRACT

An electronic control unit includes a main microcomputer and a sub-microcomputer. Both the microcomputers include buffers for initialization and buffers for normal processing. At the time of startup of the main microcomputer and the sub-microcomputer, the sub-microcomputer reads out a correction value from a memory, stores the correction value in its buffers for initialization, and also transmits the correction value to the main microcomputer, which stores the correction value in its buffers for initialization.

15 Claims, 13 Drawing Sheets

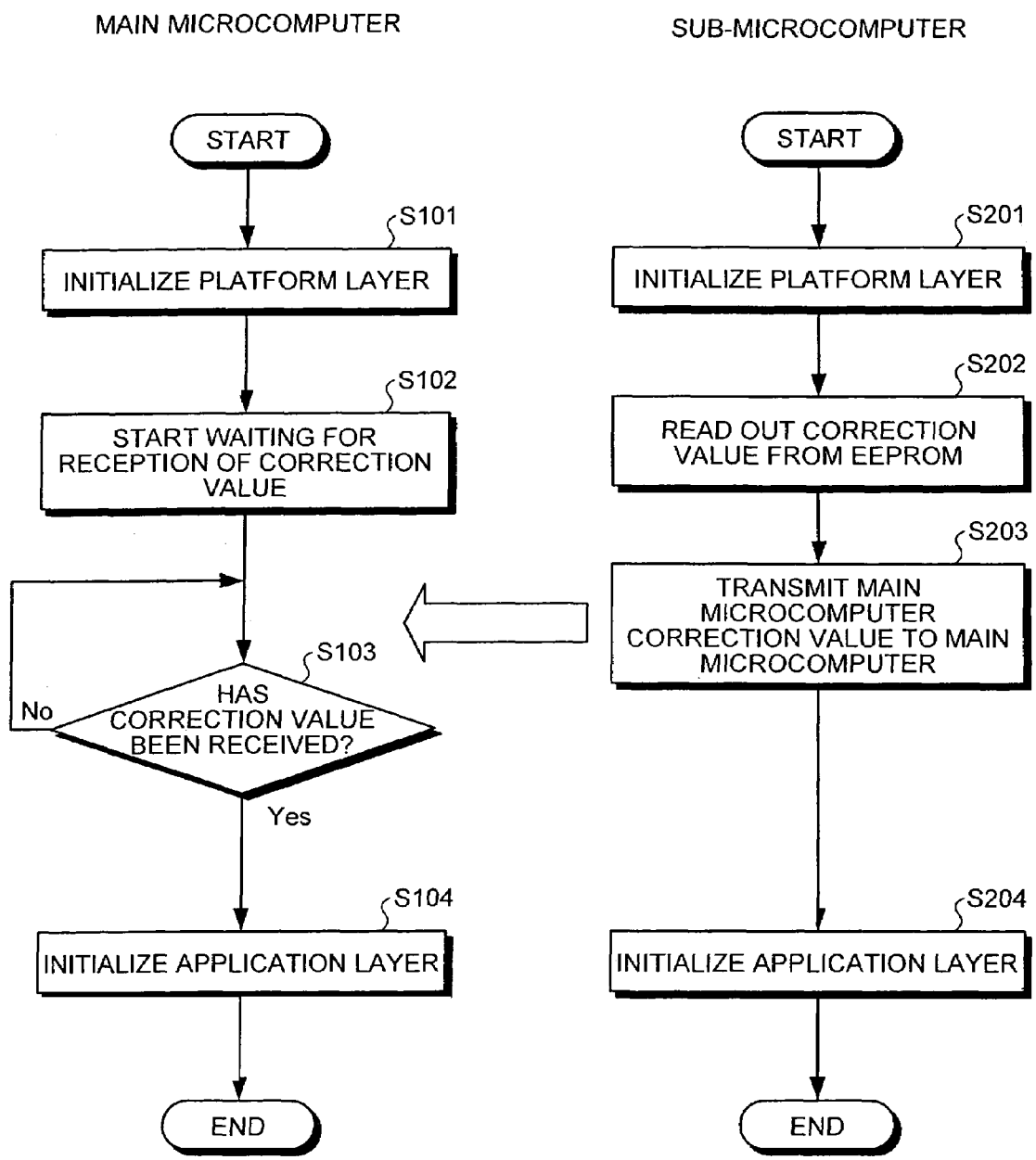

TRANSMITTING DATA FROM A SINGLE STORAGE UNIT BETWEEN MULTIPLE PROCESSORS DURING BOOTING

BACKGROUND OF THE INVENTION

1) Field of the Invention

The present invention relates to an electronic control unit that includes plural processing units.

2) Description of the Related Art

Some vehicle are provided with an electronic control unit (ECU). The ECU electronically controls various kinds of processing necessary for operating the vehicle. For example, the ECU is made to control injection of gasoline in the engine based on information from a speed sensor, a water temperature sensor. As a result, appropriate amount of gasoline can be injected into the engine.

An ECU includes a plurality of processing units (microcomputers) which make it possible to realize high-level processing by an inexpensive system. However, if a system has many processing units, it is important that the processing units cooperate efficiently with each other.

A multiprocessor system is disclosed in Japanese Patent Application Laid-Open No. 2002-312334. In this multiprocessor system, a main processor is started earlier than sub-processors, and a startup program for the sub-processors is written in a memory for the sub-processors as required within a defined time until the sub-processor is started. This configuration makes it possible to avoid runaway of the sub-processors.

A startup method for a multiprocessor board is disclosed in Japanese Patent Application Laid-Open No. H8-87481. Initial programs for a plurality of subordinate processing devices are stored in a volatile memory that can be commonly accessed from all the subordinate processing devices. Each of the subordinate processing devices read the initial programs from the volatile memory simultaneously or one-after-other and perform an initial processing. This configuration makes it possible to eliminate a read-only nonvolatile memory for storing initial programs.

Another approach to increase the efficiency is to use a speedy communication unit in a system like Direct Memory Access (DMA). For example, Japanese Patent Application Laid-Open No. H5-289979 discloses a technology for improving a usage efficiency of a buffer by judging a boundary of data according to data transfer control information including transfer control conditions, data transfer source addresses, data transfer destination addresses, and the number of transferred words and controlling a transfer destination of data or a transfer source of data and the number of transferred words based on a result of the judgment.

A printer apparatus is disclosed in Japanese Patent Application Laid-Open No. 2003-48345. In this printer apparatus, a common bus is used effectively by changing a method of transmitting communication data from a host apparatus according to whether print data is being transferred.

Incidentally, in an ECU in which analog data is input as an input signal, it is necessary to correct the input signal. More specifically, since supply voltages of a power supply IC of each ECU are generally not uniform, when an input signal is evaluated with a voltage supplied by the power supply IC as reference, fluctuation in evaluation depending on fluctuation in outputs of the power supply IC occurs. Thus, to evaluate a value of an input signal accurately, it is necessary to correct fluctuation in supply voltages of the power supply IC.

Since a correction amount, which should be applied to an input signal, depends on a power supply IC, the correction value is determined at the time of assembly of an ECU and stored in a nonvolatile storage medium like an Electrically Erasable and Programmable ROM (EEPROM). Then, the correction value is read out and used at the time of startup of respective processing units (microcomputers, etc.), whereby it is possible to perform evaluation of the input signal accurately.

When there are plural processing units in an ECU, provision of dedicated nonvolatile recording media in the respective processing units leads to an increase in cost and an increase in overall size. Thus, it is desirable that correction values to be used by all the processing units are stored in one storage medium, and a processing unit reads out one correction value and transmits the correction value to the other processing units.

However, if the corrections values are managed unitarily in one storage medium and transmitted to the processing units in this way, the respective processing units cannot process an input signal until the processing units receive a correction value. Therefore, there is a problem in that, if an ECU is not actuated until all the processing units receive a correction value, a startup time increases. In addition, there is a problem in that, if the ECU is actuated before the processing units receive the correction value completely, abnormality in operation occurs because an accurate input signal is not obtained.

Thus, conventionally, in an ECU that has plural processing units and uses an analog signal requiring correction, it is important to increase speed of startup of the processing units and actuate the processing units accurately and safely.

SUMMARY OF THE INVENTION

It is an object of the present invention to at least solve the problems in the conventional technology.

An electronic control unit according to an aspect of the present invention includes a plurality of processing units, including a first processing unit and at least one second processing unit, wherein the first processing unit reads out a correction value from a storage unit and transmits the correction value to the second processing unit, and the first processing unit and the second processing unit correct input and output signals based on the correction value. The first processing unit and the second processing unit respectively include a communication unit that performs reception and transmission of the correction value. Each of the communication units includes a buffer-for-startup that is used at the time of startup of a corresponding processing unit and stores the correction value at the time of the startup; and a buffer-for-normal processing that is used after the startup of the processing units and stores the correction value after the startup.

An electronic control unit according to an aspect of the present invention includes a plurality of processing units, including a first processing unit and at least one second processing unit, that initialize platform layers and application layers at the time of startup; and a storage unit that is provided in the first processing unit and stores a corrections value that is used for correcting input and output signals that the processing units uses in initialization of the application layer. The first processing unit performs initialization processing for the platform layer, reads out the correction value from the storage unit and transmits the correction value read to the second processing unit. The second processing unit executes initialization of the platform layer and executes initialization processing for the application layer after being on standby until the correction value is received.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a flowchart for explaining a processing operation at the time of startup of the ECU shown in FIG. 1;

DETAILED DESCRIPTION

Exemplary embodiments of an electronic control unit according to the present invention will be hereinafter explained in detail with reference to the accompanying drawings.

Figure 1:
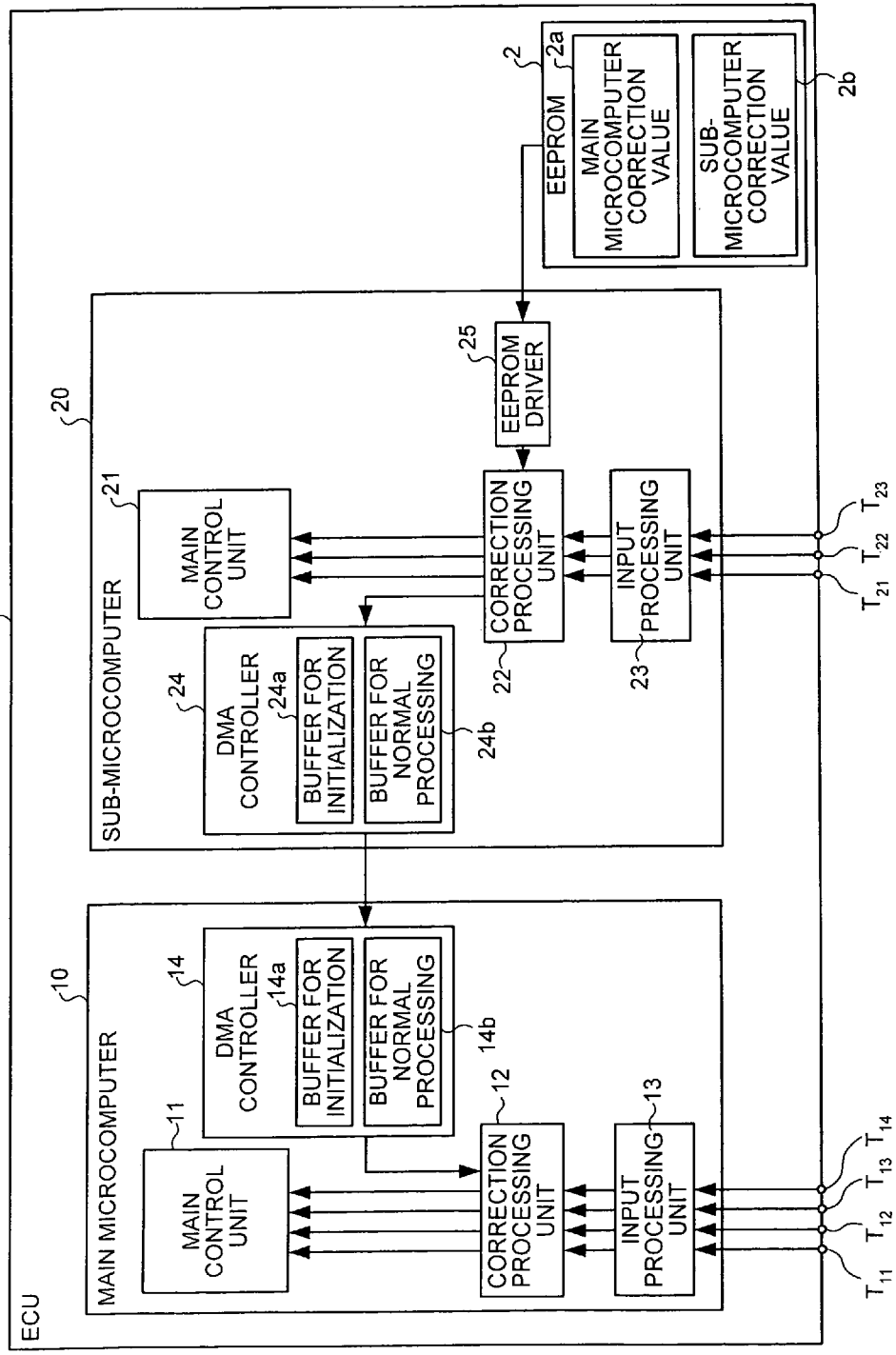
FIG. 1 is a schematic diagram of a schematic structure of an ECU according to a first embodiment of the present invention.

First, a schematic structure of an electronic control unit (ECU) 1 according to a first embodiment of the present invention will be explained in detail with reference to FIG. 1. An ECU 1 according to the first embodiment has input terminals T11 to T14 and input terminals T21 to T23. Moreover, the ECU 1 includes a main microcomputer 10, a sub-microcomputer 20, and an EEPROM 2.

The ECU 1 is, for example, an engine control ECU for vehicles. Input signals indicating a water temperature, an intake pressure, an intake temperature, a battery voltage, an oil pressure, an oil temperature, a throttle opening, and the like are input to the input terminals T11 to T14 and the input terminals T21 to T23 as analog voltage signals.

The main microcomputer 10 performs processing using analog signals input to the input terminals T11 to T14. The sub-microcomputer 20 performs processing using analog signals input to the input terminals T21 to T23.

More specifically, the main microcomputer 10 includes an input processing unit 13, a correction processing unit 12, a main control unit 11, and a DMA controller 14. The sub-microcomputer 20 includes an input processing unit 23, a correction processing unit 22, a main control unit 21, a DMA controller 24, and an EEPROM driver 25. The EEPROM 2 stores a main microcomputer correction value 2a and a sub-microcomputer correction value 2b.

The main microcomputer correction value 2a is a value that the main microcomputer 10 uses for correction of an input signal. The main microcomputer correction value 2a is determined at the time of manufacture of the ECU 1 and stored in the EEPROM 2. Similarly, the sub-microcomputer correction value 2b is a value that the sub-microcomputer 20 uses for correction of an input signal. The sub-microcomputer correction value 2b is determined at the time of manufacture of the ECU 1 and stored in the EEPROM 2.

Thus, the main microcomputer 10 and the sub-microcomputer 20 are input with analog signals and perform processing. However, supply voltages of power supply ICs mounted on ECUs are not uniform in a strict sense. Therefore, a necessary correction value is calculated and stored in the EEPROM 2 at the time of manufacture of an ECU, that is, at the point when a power supply IC is mounted on the ECU, and fluctuation in outputs of the power supply ICs is corrected to evaluate a value of an input signal accurately.

The input processing unit 23 in the sub-microcomputer 20 outputs analog voltage signals input from the input terminals 21 to 23 to the correction processing unit 22. The EEPROM driver 25 reads out the main microcomputer correction value 2a and the sub-microcomputer correction value 2b from the EEPROM 2 and outputs the correction values to the correction processing units 22.

The correction processing unit 22 uses the sub-microcomputer correction value 2b to correct a value of an input signal input from the input processing unit 23 and outputs the value to the main control unit 21. The correction processing unit 22 outputs the main microcomputer correction value 2a to the DMA controller 24.

The DMA controller 24 is a communication unit that performs communication between the sub-microcomputer 20 and the main microcomputer 10. More specifically, the DMA controller 24 performs data communication in a DMA transfer system. The data communication by the DMA controller 24 is used for exchange of various data between the main microcomputer 10 and the sub-microcomputer 20. The DMA controller 24 also transmits the main microcomputer correction value 2a via the DMA controller 24.

The main control unit 21 is a processing unit that executes processing based on a corrected input signal. More specifically, the main control unit 21 includes a Central Processing Unit (CPU) and a memory and executes an application for performing engine control.

The input processing unit 13 in the main microcomputer 10 outputs analog voltage signals input from the input terminals T11 to T14 to the correction processing unit 12. The DMA controller 14 outputs the main microcomputer correction value 2a received from the DMA controller 24 to the correction processing unit 12.

The correction processing unit 12 uses the main microcomputer correction value 2a to correct a value of an input signal input from the input processing unit 13 and outputs the value to the main control unit 11. The main control unit 11 is a processing unit that executes processing based on the corrected input signal. More specifically, the main control unit 11 includes a Central Processing Unit (CPU) and a memory and executes an application for performing engine control.

Next, DMA communication, which is performed between the main microcomputer 10 and the sub-microcomputer 20, will be explained. In data transmission and reception by the DMA, buffers having an identical structure are provided on a transmission side and a reception side, and the transmission side writes data according to the structure of the buffer and transmits the data. Therefore, the reception side can learn which data is written in which position from the structure of the buffer.

In the ECU 1, the sub-microcomputer 20 reads out the main microcomputer correction value 2a and transmits the main microcomputer correction value 2a via the DMA. This can make an EEPROM dedicated for the main microcomputer 10 unnecessary and simplify the structure of the main microcomputer 10. However, on the other hand, at the time of startup of the main microcomputer 10, it is impossible to complete initialization until the main microcomputer 10 receives the main microcomputer correction value 2a. Moreover, it is only the main microcomputer correction value 2a that is required to be transmitted in performing the initialization.

When data communication is performed via a DMA controller having a single buffer as in the past with this structure, since time equivalent to a capacity of the buffer is required for the DMA communication, time required for the initialization of the main microcomputer 10 increases.

Thus, in the ECU 1 according to the present invention, buffers for initialization 14a and 24a and buffers for normal processing 14b and 24b are provided in the DMA controllers 14 and 24 to switch buffers to be used at the time of initialization and after initialization processing. Examples of structures of the buffers in the DMA controllers 14 and 24 are shown in FIGS. 2A and 2B.

Figure 2A:
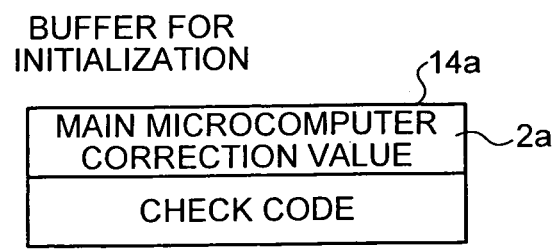
FIG. 2A is an explanatory diagram for explaining a structure of a buffer for initialization shown in FIG. 1.
Figure 2B:
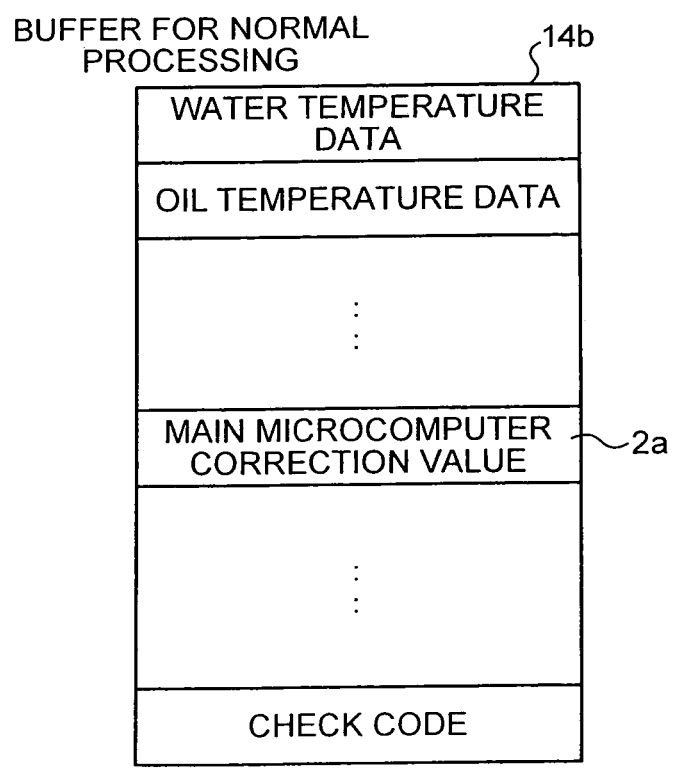
FIG. 2B is an explanatory diagram for explaining a structure of a buffer for normal processing shown in FIG. 1.

FIG. 2A is an explanatory diagram for explaining a structure of the buffer for initialization 14a. FIG. 2B is an explanatory diagram for explaining a structure of the buffer for normal processing 24a. Note that structures of the buffer for initialization 24a and the buffer for normal processing 24b are the same as those of the buffer for initialization 14a and the buffer for normal processing 14b, respectively.

As shown in FIG. 2A, the buffer for initialization 14a has only the main microcomputer correction value 2a and a check code. On the other hand, as shown in FIG. 2B, the buffer for normal processing 14b has areas for various data, which the main microcomputer 10 and the sub-microcomputer 20 communicate in normal processing after startup, like water temperature data and oil temperature data in addition to the check code.

In this way, the buffers for initialization 14a and 24a and the buffers for normal processing 14b and 24b are switched to be used, and only the main microcomputer correction value 2a necessary for startup and the check code for confirming that communication is performed normally are given to the buffers for initialization 14a and 24a. Thus, speed of initialization of the main microcomputer 10 can be increased. In addition, since the areas for various data necessary for processing after startup are given to the buffers for normal processing 14b and 24b, an operation is never restricted in communication processing after startup.

Next, processing at the time of startup of the ECU 1 will be explained. FIG. 3 is a flowchart for explaining a processing operation at the time of startup of the ECU 1. A flow shown in the figure is started at the time of application of a power supply to the ECU 1, and the main microcomputer 10 and the sub-microcomputer 20 start initialization processing independently from each other. First, the main microcomputer 10 initializes a platform layer (step S101) and then starts waiting for reception of the main microcomputer correction value 2a (step S102).

If the main microcomputer 10 receives the main microcomputer correction value 2a from the sub-microcomputer 20 (Yes in step S103), the main microcomputer 10 initializes an application layer (step S104) and ends the initialization processing.

On the other hand, first, the sub-microcomputer 20 initializes a platform layer (step S201) and then reads out the main microcomputer correction value 2a and the sub-microcomputer correction value 2b from the EEPROM 2 (step S202). The sub-microcomputer 20 transmits the main microcomputer correction value 2a to the main microcomputer 10 via the DMA controller 24 (step S203). At this point, the DMA controller 24 uses the buffer for initialization 24a. Thereafter, the sub-microcomputer 20 initializes an application layer (step S204) and ends the initialization processing.

In this way, the sub-microcomputer 20 transmits the main microcomputer correction value 2a to the main microcomputer 10 in the initial processing of the sub-microcomputer 20, and the main microcomputer 10 performs the initialization processing after receiving the main microcomputer correction value 2a. However, it is possible to minimize a waiting time of the main microcomputer 10 by using the buffers for initialization 14a and 24a for the transmission of the main microcomputer correction value 2a.

Figure 4:
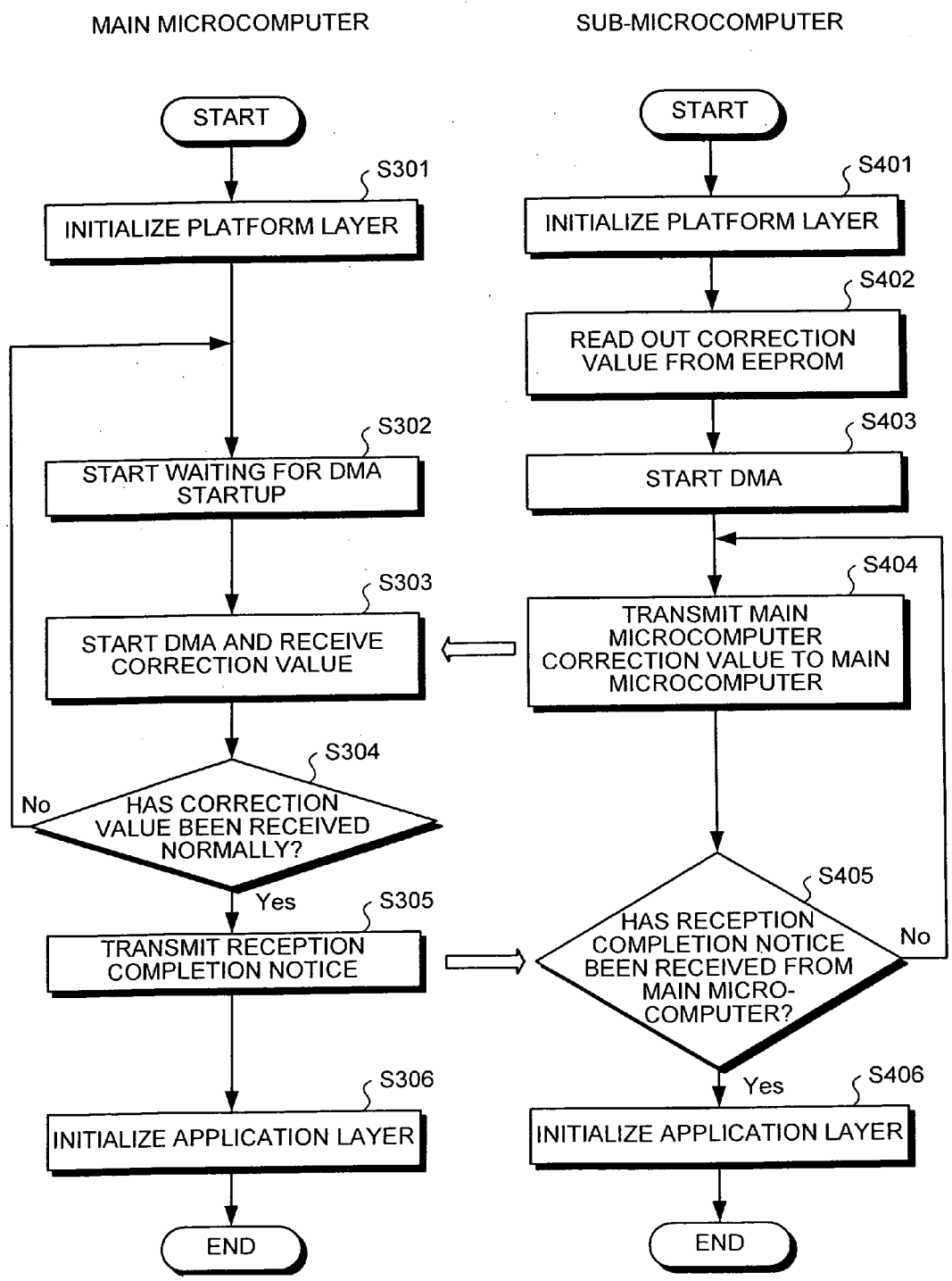
FIG. 4 is a flowchart for explaining startup processing in starting a DMA from a sub-microcomputer more in detail.

Here, startup of the DMA may be performed from whichever of the main microcomputer 10 and the sub-microcomputer. FIG. 4 is a flowchart for explaining startup processing at the time when the DMA is started from sub-microcomputer 20 more in detail. A flow shown in the figure is processing that is started at the time of application of a power supply to the ECU 1 as in the flow shown in FIG. 3. First, the main microcomputer 10 initializes the platform layer (step S301) and then starts waiting for DMA startup from the sub-microcomputer 20 (step S302).

When the sub-microcomputer 20 transmits the main microcomputer correction value 2a with the DMA, the main microcomputer 10 starts the DMA to receive the main microcomputer correction value 2a (step S303). Thereafter, the main microcomputer 10 judges whether the main microcomputer 10 has received the main microcomputer correction value 2a normally using the check code (step S304).

If the main microcomputer 10 has not received the main microcomputer correction value 2a normally (No in step S304), the main microcomputer 10 starts waiting for DMA startup again (step S302). On the other hand, if the main microcomputer 10 has received the main microcomputer correction value 2a normally (Yes in step S304), the main microcomputer 10 transmits a reception completion notice to the sub-microcomputer 20 (step S305), initializes the application layer (step S306), and ends the initialization processing.

On the other hand, first, the sub-microcomputer 20 initializes the platform layer (step S401) and then reads out the main microcomputer correction value 2a and the sub-microcomputer correction value 2b from the EEPROM 2 (step S402). Thereafter, the sub-microcomputer 20 starts the DMA (step S403) and transmits the main microcomputer correction value 2a to the main microcomputer 10 via the DMA controller 24 (step S404).

Then, the sub-microcomputer 20 judges whether the sub-microcomputer 20 has received the reception completion notice from the main microcomputer 10 (step S405). If the sub-microcomputer 20 has not received the reception completion notice from the main microcomputer 10 (No in step S405), the sub-microcomputer 20 transmits the main microcomputer correction value 2*a* to the main microcomputer 10 again (step S404).

On the other hand, if the sub-microcomputer 20 has received the reception completion notice from the main microcomputer 10 (Yes in step S405), the sub-microcomputer 20 initializes the application layer (step S406) and ends the initialization processing.

Figure 5:
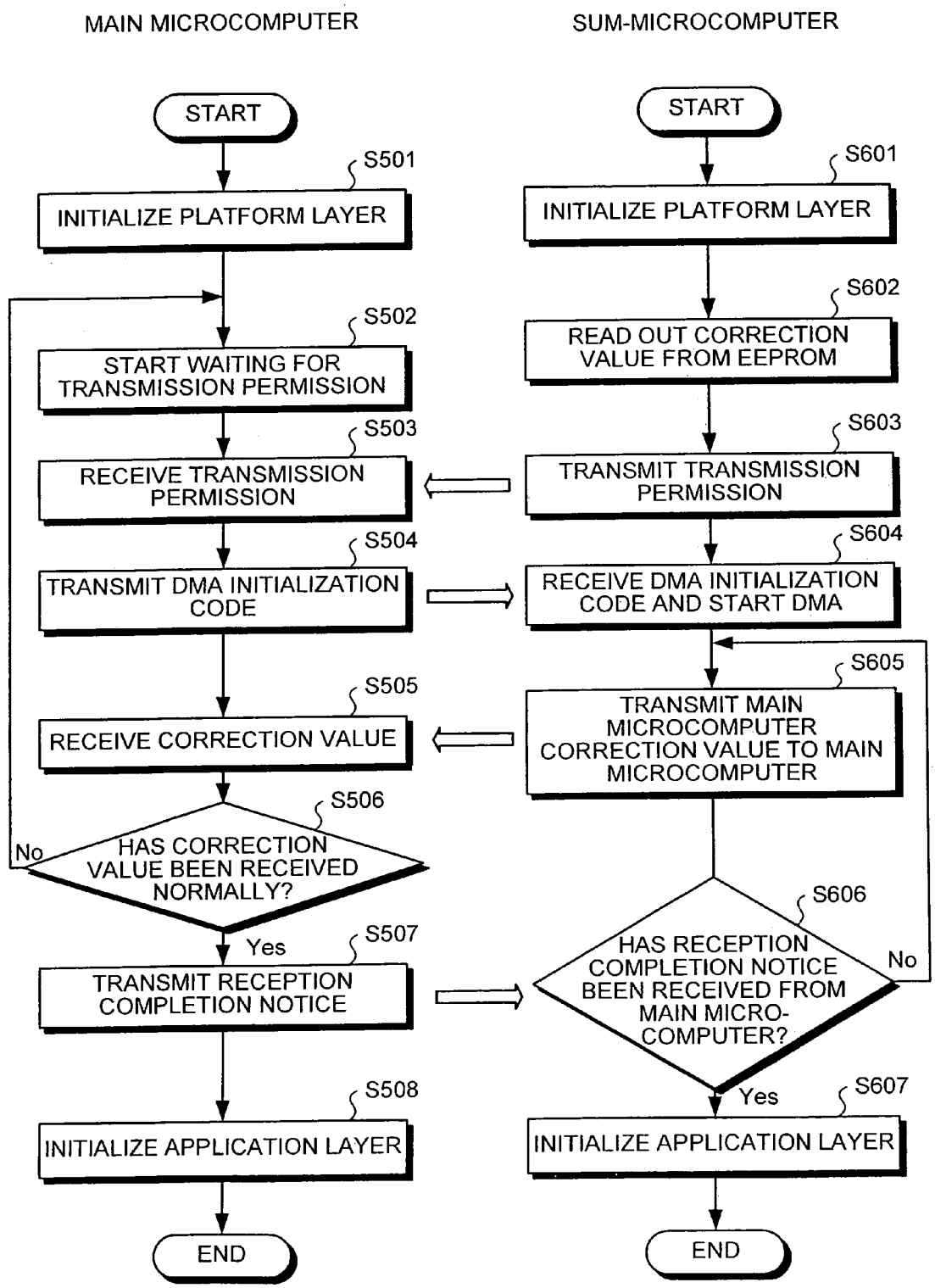
FIG. 5 is a flowchart for explaining startup processing in starting the DMA from a main microcomputer 10 more in detail.

Subsequently, startup processing at the time when the DMA is started from the main microcomputer 10 will be explained. FIG. 5 is a flowchart for explaining startup processing at the time when the DMA is started from the main microcomputer 10 more in detail. Note that a flow shown in the figure is processing that is started at the time of application of a power supply to the ECU 1 as in the flow shown in FIG. 3. First, the main microcomputer 10 initializes the platform layer (step S501) and then starts waiting for transmission permission from the sub-microcomputer 20 (step S502).

When the main microcomputer 10 receives transmission permission from the sub-microcomputer 20 (step S503), the main microcomputer 10 initializes the DMA and transmits a DMA initialization code to the sub-microcomputer 20 (step S504). Then, the main microcomputer 10 receives the main microcomputer correction value 2*a* (step S505) and judges whether the main microcomputer 10 has received the main microcomputer correction value 2*a* normally (step S506).

If the main microcomputer 10 has not received the main microcomputer correction value 2*a* normally (No in step S506), the main microcomputer 10 starts waiting for transmission permission again (step S502). On the other hand, if the main microcomputer 10 has received the main microcomputer correction value 2*a* normally (Yes in step S506), the main microcomputer 10 transmits a reception completion notice to the sub-microcomputer 20 (step S507), initializes the application layer (step S508), and ends the initialization processing.

On the other hand, first, the sub-microcomputer 20 initializes the platform layer (step S601), then reads out the main microcomputer correction value 2*a* and the sub-microcomputer correction value 2*b* from the EEPROM 2 (step S602), and transmits transmission permission to the main microcomputer 10 (step S603). Then, the sub-microcomputer 20 receives the DMA initialization code transmitted by the main microcomputer 10 to start the DMA (step S604), and transmits the main microcomputer correction value 2*a* to the main microcomputer 10 (step S605).

Thereafter, the sub-microcomputer 20 judges whether the sub-microcomputer 20 has received the reception completion notice from the main microcomputer 10 (step S606). If the sub-microcomputer 20 has not received the reception completion notice from the main microcomputer 10 (No in step S606), the sub-microcomputer 20 transmits the main microcomputer correction value 2*a* to the main microcomputer 10 again (step S605).

On the other hand, if the sub-microcomputer 20 has received the reception completion notice from the main microcomputer 10 (Yes in step S606), the sub-microcomputer 20 initializes the application layer (step S607) and ends the initialization processing.

Next, normal processing of the ECU 1 will be explained. Even after a power supply is applied to the ECU 1 to start the main microcomputer 10 and the sub-microcomputer 20, the sub-microcomputer 20 reads out the main microcomputer correction value 2*a* and the sub-microcomputer correction value 2*b* from the EEPROM 2 periodically and transmits the main microcomputer correction value 2*a* to the main microcomputer 10. The main microcomputer 10 can prevent abnormality in operation due to data transformation of a correction value by always using the received latest main microcomputer correction value 2*a*.

Figure 6:
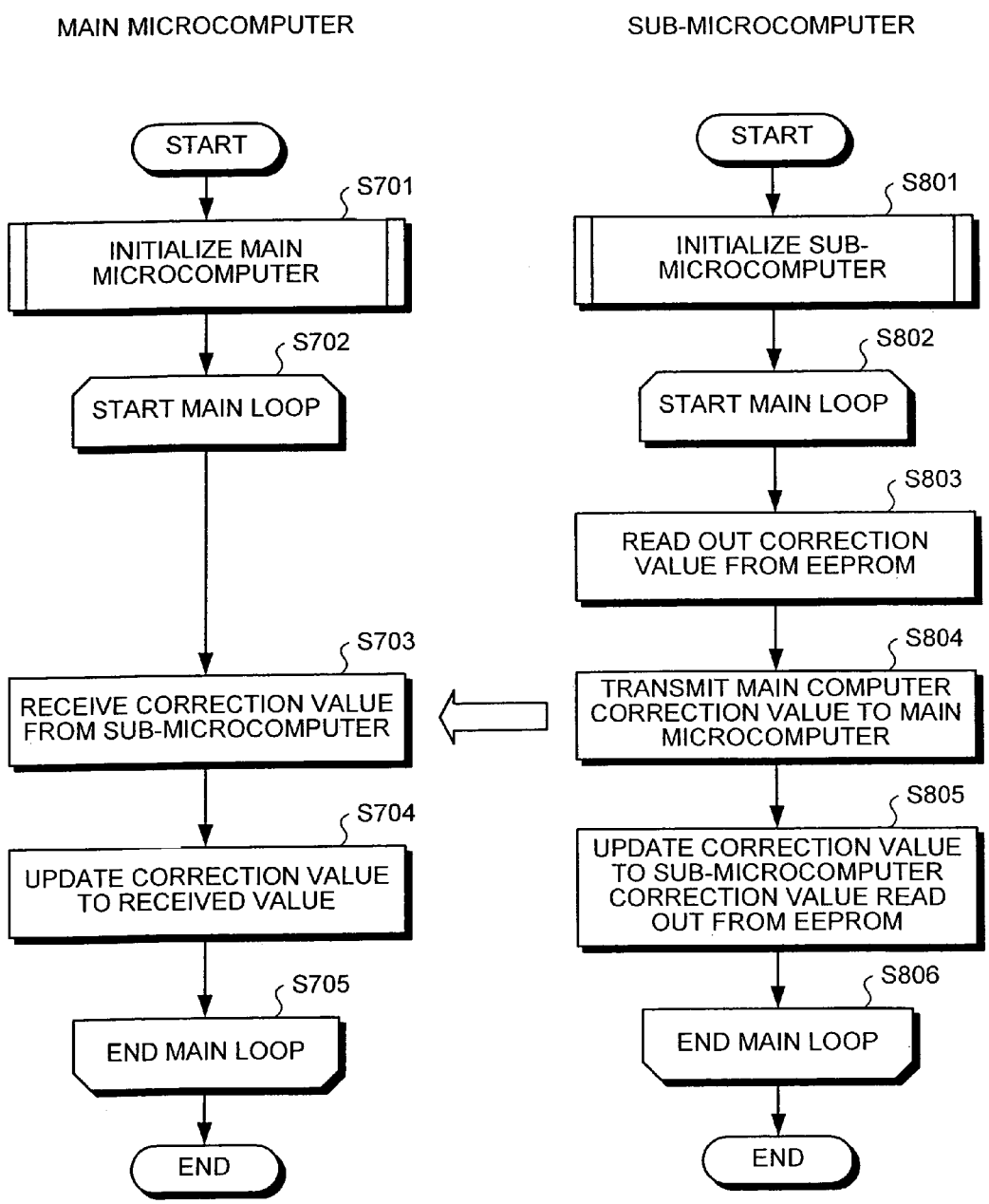
FIG. 6 is a flowchart for explaining a processing operation after the startup of the ECU shown in FIG. 1.

FIG. 6 shows a normal processing operation of the ECU 1. A flow shown in FIG. 6 explains an operation from the time of application of a power supply to the ECU 1 until normal processing. The flow is started at the time of application of a power supply to the ECU 1. The main microcomputer executes initialization processing (step S701) and then starts a main loop (step S702). The processing explained in FIGS. 3 to 5 only has to be used as the initialization processing indicated in step S701.

After starting the main loop (step S702), the main microcomputer 10 receives the main microcomputer correction value 2*a* from the sub-microcomputer 20 (step S703), updates a correction value to be used by the correction processing unit 12 to the received value (step S704), and ends the main loop (step S705). The main loop indicated in steps S702 to S705 is executed repeatedly until the power supply to the ECU 1 is turned off or the main microcomputer 10 is restarted.

On the other hand, the sub-microcomputer 20 executes initialization processing (step S801) and then starts a main loop (step S802). Note that the processing explained in FIGS. 3 to 5 only has to be used as the initialization processing indicated in step S801.

After starting the main loop (step S802), the sub-microcomputer 20 reads out the main microcomputer correction value 2*a* and the sub-microcomputer correction value 2*b* from the EEPROM 2 (step S803) and transmits the main microcomputer correction value 2*a* to the main microcomputer 10 via the DMA controller 24 (step S804). At this point, the DMA controller 24 uses the buffer for normal processing 24*b*.

Thereafter, the sub-microcomputer 20 updates a correction value to be used by the correction processing unit 22 to the value read out from the EEPROM 2 (step S805) and ends the main loop (step S806). The main loop indicated in steps S802 to S806 is executed repeatedly until the power supply to the ECU 1 is turned off or the sub-microcomputer 20 is restarted.

Incidentally, when a correction value is not normal due to abnormality in the main microcomputer 10, abnormality in the sub-microcomputer 20, failure of the EEPROM 2, noise in a DMA communication line, or the like, it is desirable to perform failsafe in order to prevent a malfunction from being caused by using an abnormal correction value.

It is possible to detect whether a correction value is within a normal range by, for example, judging whether the value is within a range guaranteed by a power supply IC mounted on the ECU 1. For example, when accuracy of the power supply IC is ±5%, it is judged that a correction value is normal if the correction value is 0.95 or more and 1.05 or less, and it is judged that a correction value is abnormal if the correction value deviates from this range. Note that, here, it is assumed that the correction processing is performed by multiplying a correction value.

Figure 7:
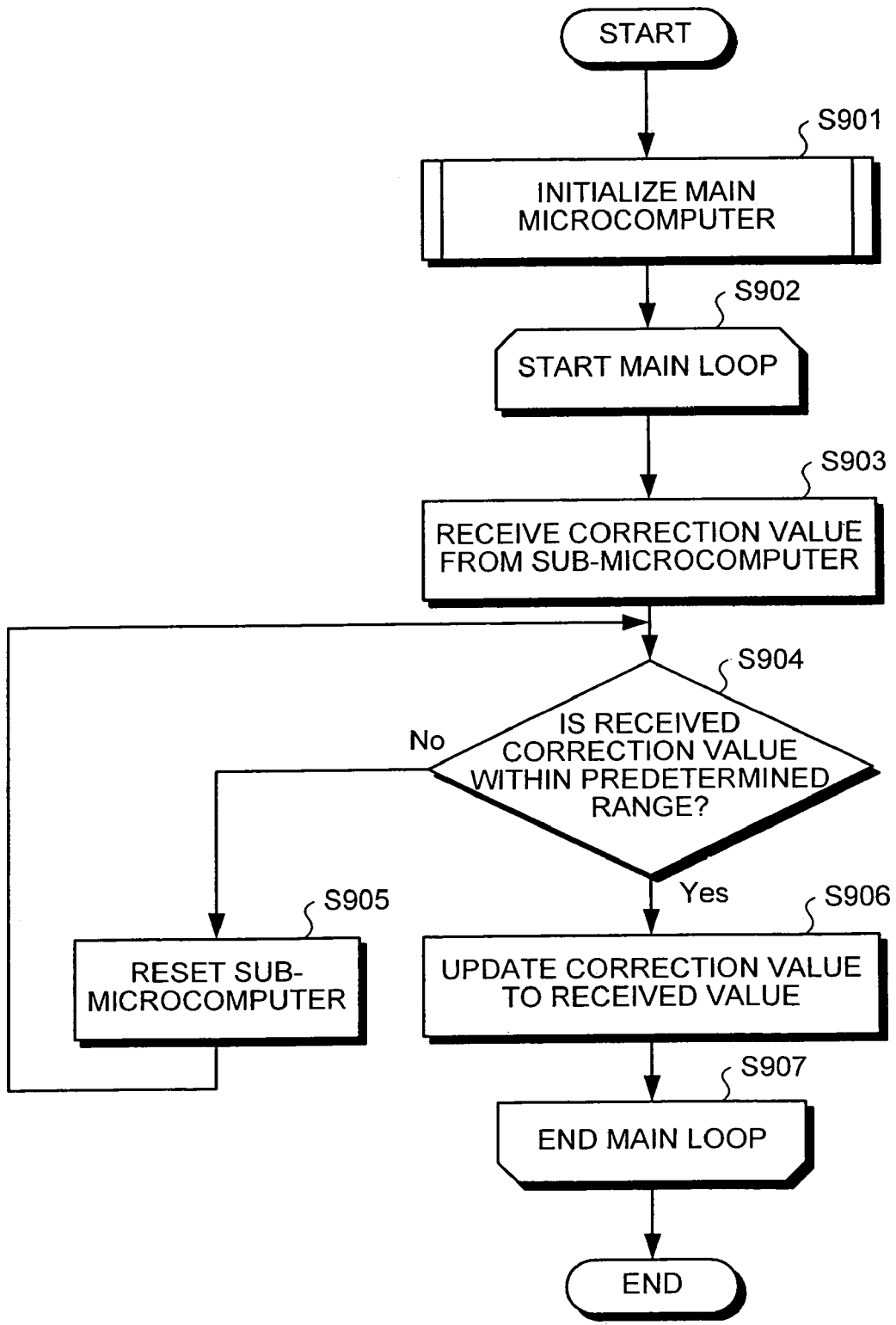
FIG. 7 is a flowchart for explaining failsafe processing according to reset of the sub-microcomputer.

Moreover, when abnormality in a correction value is caused by abnormality in operation of the sub-microcomputer 20, it is possible to reset the correction value by restarting the sub-microcomputer 20 from the main microcomputer 10. FIG. 7 is a flowchart for explaining failsafe processing by reset of the sub-microcomputer 20. This flow explains an operation from the time of application of a power supply to the ECU 1 until normal processing. The flow is started at the time of the application of the power supply to the ECU 1. The main microcomputer 10 executes initialization processing (step S901) and then starts a main loop (step S902). Here, the same processing as the processing explained in FIGS. 3 to 5 only has to be used as the initialization processing indicated in step S901.

After starting the main loop (step S902), the main microcomputer 10 receives the main microcomputer correction value 2a from the sub-microcomputer 20 (step S903), and judges whether the received correction value is within a predetermined range (step S904). As a result, if the received correction value deviates from the predetermined range (No in step S904), the main microcomputer 10 resets or restarts the sub-microcomputer 20 (step S905) and shifts to step S904 again.

On the other hand, if the received correction value is within the predetermined range (Yes in step S904), the main microcomputer 10 updates a correction value to be used by the correction processing unit 12 to the received value (step S906) and ends the main loop (step S907). The main loop indicated in steps S902 to S907 is executed repeatedly until the power supply to the ECU 1 is turned off or the main microcomputer 10 is restarted.

Figure 8:
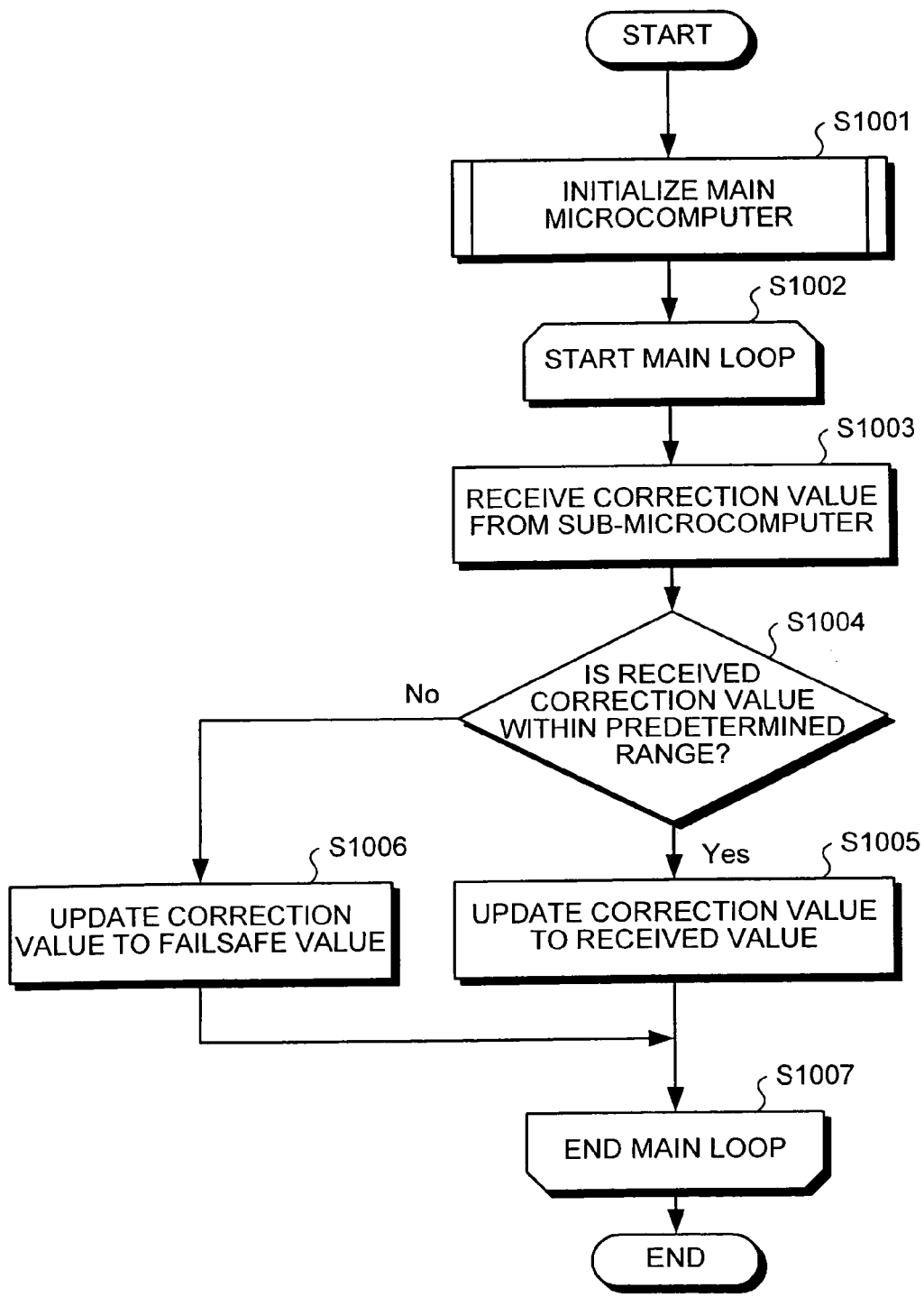
FIG. 8 is a flowchart for explaining processing that uses a failsafe value when a correction value is abnormal.

As another kind of failsafe processing, a failsafe value decided in advance may be used as a correction value at the time when a correction value is abnormal. This failsafe value is assumed to be a value with which it is possible to control a microcomputer safely. FIG. 8 is a flowchart for explaining processing in which a failsafe value is used at the time when a correction value is abnormal. This flow explains an operation from the time of application of a power supply to the ECU 1 until normal processing. The flow is started when the power supply is applied to the ECU 1. The main microcomputer 10 executes initial processing (step S1001) and then starts a main loop (step S1002). Here, the same processing as the processing explained in FIGS. 3 to 5 only has to be used as the initialization processing indicated in step S1001.

After starting the main loop (step S1002), the main microcomputer 10 receives the main microcomputer correction value 2a from the sub-microcomputer 20 (step S1003) and judges whether the received correction value is within a predetermined range (step S1004). As a result, if the received correction value deviates from the predetermined range (No in step S1004), the main microcomputer 10 updates a correction value to be used by the correction processing unit 12 to a failsafe value (step S1006) and ends the main loop (step S1007).

On the other hand, if the received correction value is within the predetermined range (Yes in step S1004), the main microcomputer 10 updates a correction value to be used by the correction processing unit 12 to the received value (step S1005) and ends the mail loop (step S1007). The mail loop indicated in steps S1002 to S1007 is executed repeatedly until the power supply to the ECU 1 is turned off or the main microcomputer 10 is restarted.

In this way, when there is abnormality in a correction value, the failsafe processing is executed, whereby it is possible to actuate the ECU 1 safely without causing abnormality in operation of the ECU 1. Note that, in the flowcharts in FIGS. 7 and 8, detection of abnormality in a correction value at the time of normal operation is explained. However, it is also possible to detect abnormality in a correction value by the same processing during the initialization processing and execute the failsafe processing.

In addition, in the flowchart in FIG. 8, the processing in the main microcomputer 10 is explained as an example. However, in the sub-microcomputer 20, it is also possible to judge whether a correction value read out from the EEPROM 2 is within a predetermined range and, when the correction value deviates from the predetermined range, perform correction processing using a failsafe value.

As described above, in the first embodiment, the buffers for initialization and the buffers for normal processing are provided in the DMA controllers, respectively, and at the time of initialization processing, the buffers for initialization having only a correction value and a check code are used to transmit the correction value to the main microcomputer 10. Thus, it is possible to increase speed of startup of the main microcomputer 10 as well as startup of the ECU 1.

In addition, when abnormality occurs in a correction value, failsafe is performed automatically, whereby it is possible to actuate an ECU safely without causing abnormality in operation of the ECU.

Moreover, initialization of an application layer in a main microcomputer is performed after completion of reception of a correction value from a sub-microcomputer. Thus, it is possible to start the main microcomputer without causing a malfunction.

In other words, since DMA communication is impossible until initialization of a platform layer is performed, it is not preferable to apply the DMA communication to a microcomputer for which initialization of a platform layer is not performed because it is difficult to judge whether transmitted data is received normally. Therefore, in the conventional technology, in order to complete initialization of the platform layer in a microcomputer on a reception side of a correction value (main microcomputer in this embodiment) earlier than in a microcomputer on a transmission side of the correction value (sub-microcomputer in this embodiment), the microcomputer on the transmission side is caused to perform readout processing for an EEPROM requiring long time or the microcomputer on the reception side is started first and caused to instruct startup of the microcomputer on the transmission side.

However, if setting is made by this conventional technology such that the initialization of the platform layer is completed earlier for the microcomputer on the reception side, it is likely that the initialization of the application layer to be performed subsequently is performed in a state in which a correction value is not received.

Thus, as in this embodiment, the initialization of the application layer is not performed until a correction value is received after the initialization of the platform layer of the microcomputer on the reception side is completed. This makes it possible to perform both the DMA communication and the initialization of the application layer normally.

Here, the initialization of the platform layer of the microcomputer on the transmission side, that is, startup of the microcomputer on the transmission side is instructed from the microcomputer on the reception side, whereby it becomes possible to optimize a startup time of plural microcomputers and start the microcomputers at high speed and safely.

Figure 9:
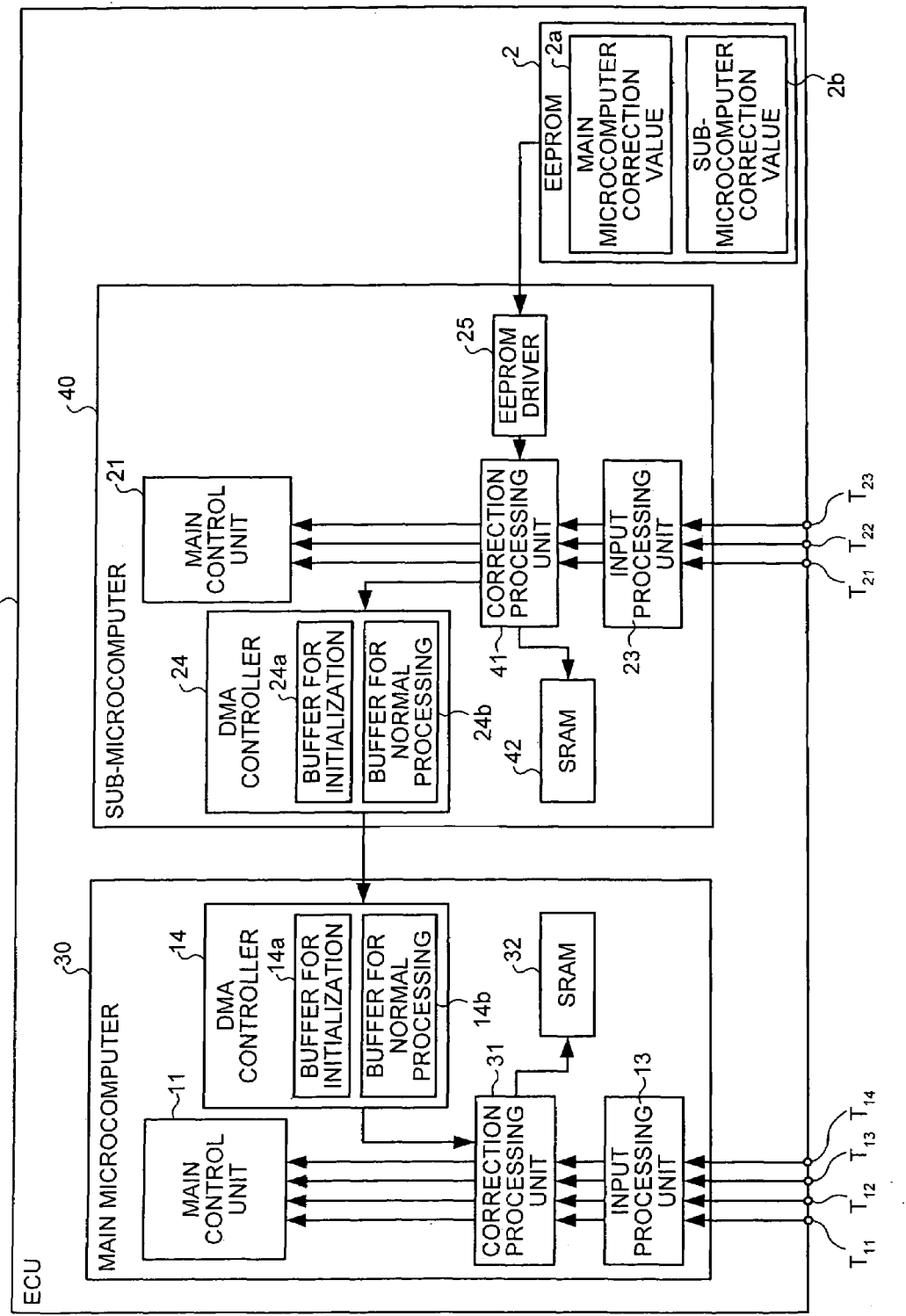
FIG. 9 is a schematic diagram of a schematic structure of an ECU according to a second embodiment of the present invention.

Next, a second embodiment of the present invention will be explained. FIG. 9 is a schematic diagram of a schematic structure of an ECU according to a second embodiment of the present invention. In an ECU 3 according to the second embodiment, Static Random Access Memories (SRAMs) 32 and 42 are provided in a main microcomputer 30 and a sub-microcomputer 40, respectively. Correction processing units 31 and 41 store correction values in the SRAMs 32 and 42 and read out and use the correction values as occasion arises. Since other structures and operations are the same as those in the ECU 1 described in the first embodiment, the identical components will be denoted by the identical reference numerals and signs, and an explanation of the components will be omitted.

The correction processing unit 41 in the sub-microcomputer 40 stores the sub-microcomputer correction value 2*b* in the SRAM 42. Thereafter, when the correction processing unit 41 corrects a value of an input signal input from the input processing unit 23, the correction processing unit 41 reads out the sub-microcomputer correction value 2*b* from the SRAM 42 and uses the same. In addition, the correction processing unit 42 outputs the main microcomputer correction value 2*a* to the DMA controller 24.

Similarly, the correction processing unit 31 in the main microcomputer 30 stores the main microcomputer correction value 2*a* received via the DMA controller 14 in the SRAM 32. Thereafter, when the correction processing unit 31 corrects a value of an input signal input from the input processing unit 13, the correction processing unit 31 reads out the main microcomputer correction value 2*a* from the SRAM 32 and uses the same.

Figure 10:
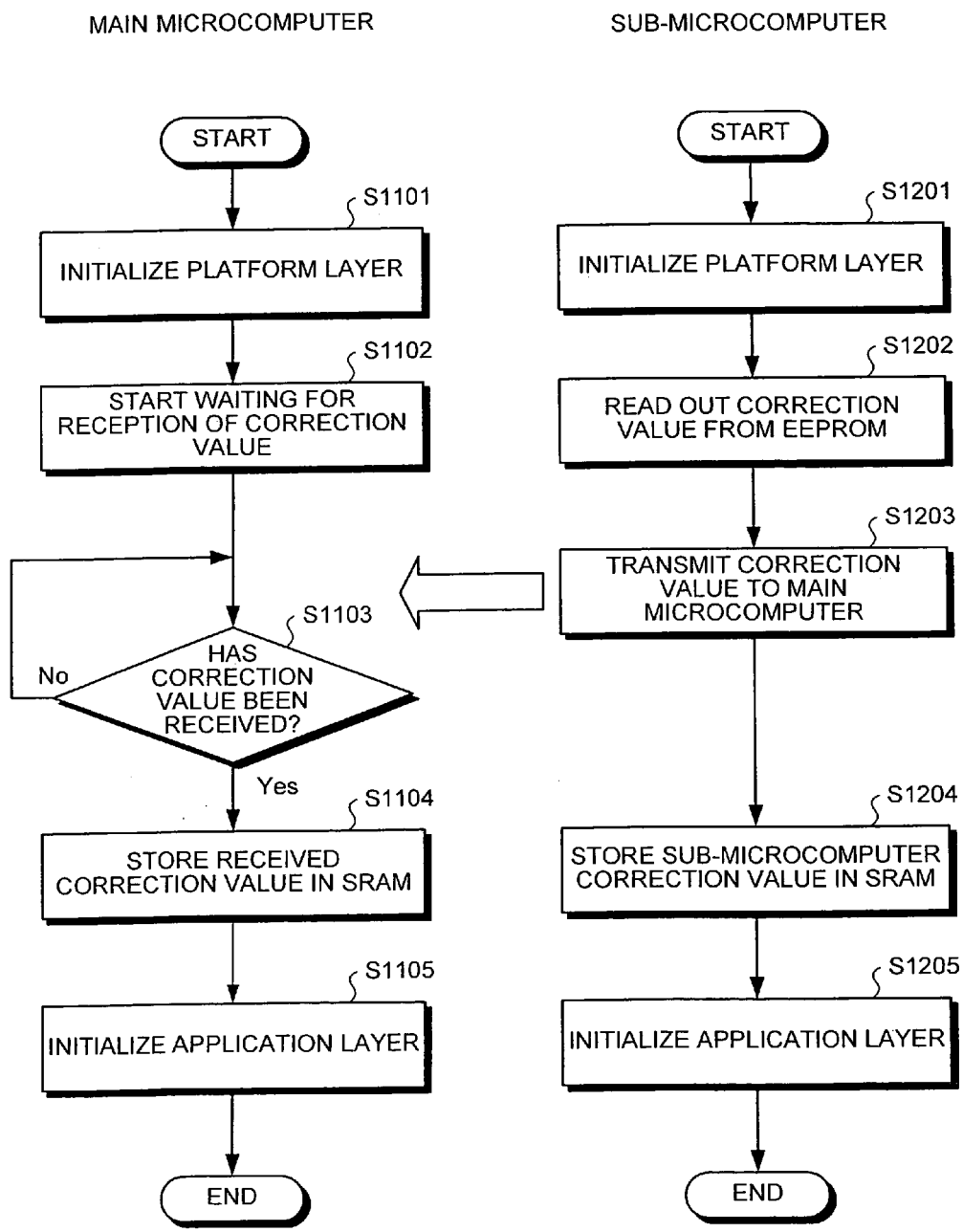
FIG. 10 is a flowchart for explaining a processing operation at the time of startup of the ECU shown in FIG. 9.

Next, processing at the time of startup of the ECU 3 will be explained. FIG. 10 is a flowchart for explaining a processing operation at the time of startup of the ECU 3. A flow shown in the figure is started at the time of application of a power supply to the ECU 3, and the main microcomputer 30 and the sub-microcomputer 40 start initialization processing independently from each other. First, the main microcomputer 30 initializes the platform layer (S1101) and then starts waiting for reception of the main microcomputer correction value 2*a* (step S1102).

When the main microcomputer 30 receives the main microcomputer correction value 2*a* from the sub-microcomputer 40 (Yes in step S1103), the main microcomputer 30 stores the received main microcomputer correction value 2*a* in the SRAM 32 (step S1104), then initializes an application layer (step S1105), and ends the initialization processing.

On the other hand, first, the sub-microcomputer 40 initializes a platform layer (step S1201) and then reads out the main microcomputer correction value 2*a* and the sub-microcomputer correction value 2*b* from the EEPROM 2 (step S1202). Moreover, the sub-microcomputer 40 transmits the main microcomputer correction value 2*a* to the main microcomputer 30 via the DMA controller 24 (step S1203). At this point, the DMA controller 24 uses the buffer for initialization 24*a*. Thereafter, the sub-microcomputer 40 stores the sub-microcomputer correction value 2*b* in the SRAM 42 (step S1204), then initializes an application layer (step S1205), and ends the initialization processing.

Next, normal processing of the ECU 3 will be explained. After a power supply is applied to the ECU 3 and the main microcomputer 30 and the sub-microcomputer 40 are started, the main microcomputer 30 reads out the main microcomputer correction value 2*a* from the SRAM 32 and uses the same. In addition, the sub-microcomputer 40 reads out the sub-microcomputer correction value 2*b* from the SRAM 42 and uses the same.

Figure 11:
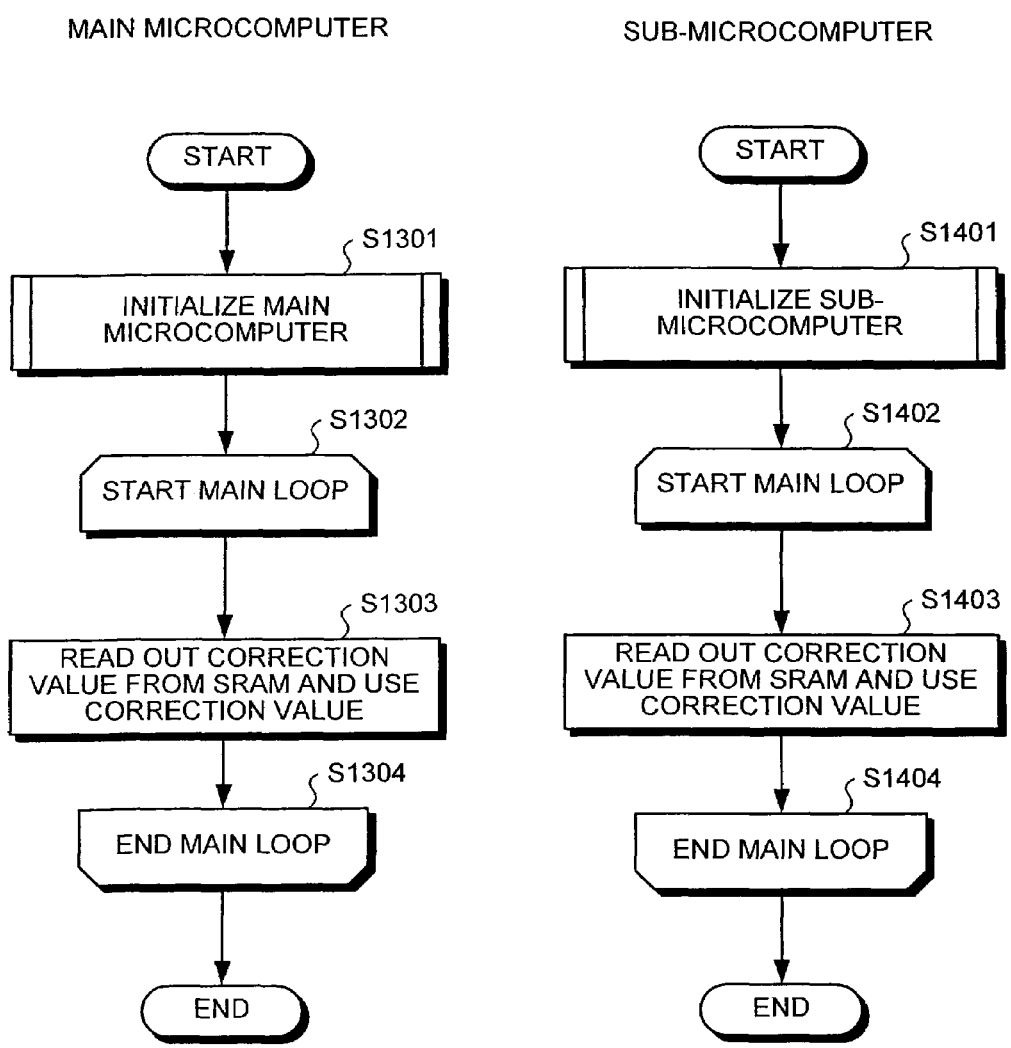
FIG. 11 is a flowchart for explaining a processing operation after the startup of the ECU shown in FIG. 9.

FIG. 11 shows a normal processing operation of the ECU 3. A flow shown in FIG. 11 explains an operation from the time of application of a power supply to the ECU 3 until the normal processing. The flow is started when the power supply is applied to the ECU 3. The main microcomputer 30 executes initialization processing (step S1301) and then starts a main loop (step S1302). Note that the processing explained in FIG. 10 only has to be used as the initialization processing indicated in step S1301.

After starting the main loop (step S1302), the main microcomputer 30 reads out the main microcomputer correction value 2*a* from the SRAM 32 to perform correction processing for an input signal (step S1303) and ends the main loop (step S1304). The main loop indicated in steps S1302 to S1304 is executed repeatedly until the power supply to the ECU 3 is turned off or the main microcomputer 30 is restarted.

On the other hand, the sub-microcomputer 40 executes initialization processing (step S1401) and then starts a main loop (step S1402). Note that the processing explained in FIG. 10 only has to be used as the initialization processing indicated in step S1401.

After starting the main loop (step S1402), the sub-microcomputer 40 reads out the sub-microcomputer correction value 2*b* from the SRAM 32 to perform correction processing for an input signal (step S1403) and ends the main loop (step S1404). The main loop indicated in steps S1402 to S1404 is executed repeatedly until the power supply to the ECU 3 is turned off or the sub-microcomputer 40 is restarted.

Incidentally, in the flow shown in FIG. 11, a correction value stored in the SRAM at the time of startup is read out and used as occasion arises. However, it is also possible that, during the normal operation, the sub-microcomputer 40 reads out a correction value from the EEPROM 2 periodically and compares the correction value with the correction value stored in the SRAM to judge whether there is abnormality in the correction value stored in the SRAM.

Figure 12:
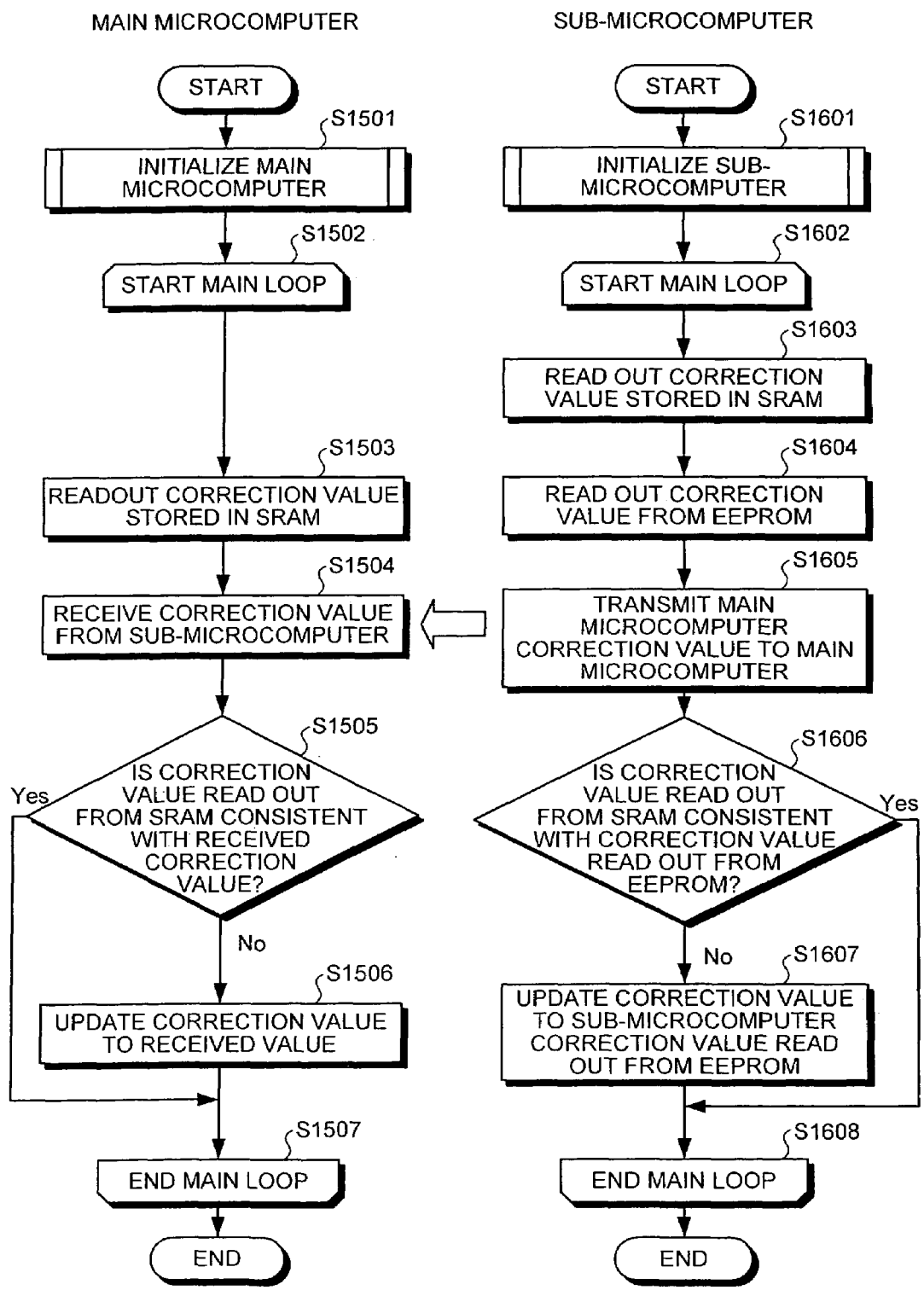
FIG. 12 is a flowchart for explaining a normal processing of the ECU at the time when a correction value is stored in an SRAM and a correction value is read out from an EEPROM periodically to update contents stored in the SRAM.

FIG. 12 is a flowchart for explaining normal processing of the ECU 3 at the time when a correction value is stored in an SRAM and a correction value is read out from an EEPROM periodically to update contents stored in the SRAM. This flowchart explains an operation from the time of application of a power supply to the ECU 3 until the normal processing. The flowchart is started when the power supply is applied to the ECU 3. The main microcomputer 30 executes initialization processing (step S1501) and then starts a main loop (step S1502). Note that the processing explained in FIG. 10 only has to be used as the initialization processing indicated in step S1501.

After starting the main loop (step S1502), the main microcomputer 30 reads out the main microcomputer correction value 2*a* from the SRAM 32 (step S1503). Thereafter, the main microcomputer 30 receives the main microcomputer correction value 2*a* from the sub-microcomputer 40 (step S1504) and judges whether the correction value read out from the SRAM 32 and the correction value received from the sub-microcomputer 40 are consistent with each other (step S1505).

When the correction value read out from the SRAM 32 and the correction value received from the sub-microcomputer 40 are not consistent with each other (No in step S1505), the main microcomputer 30 writes the correction value received from the sub-microcomputer 40 in the SRAM 32 and updates the correction value stored in the SRAM 32 to the received correction value (step S1506).

When the correction value stored in the SRAM 32 is updated (step S1506) or if the correction value read out from the SRAM 32 and the correction value received from the sub-microcomputer 40 are consistent with each other (Yes in step S1505), the main microcomputer 30 ends the main loop (step S1507). The main loop indicated in steps S1502 to S1507 is executed repeatedly until the power supply to the ECU 3 is turned off or the main microcomputer 30 is restarted.

On the other hand, the sub-microcomputer 40 executes initialization processing (step S1601) and then starts a main loop (step S1602). Note that the processing explained in FIG. 10 only has to be used as the initialization processing indicated in step S1601.

After starting the main loop (step S1602), the sub-microcomputer 40 reads out the sub-microcomputer correction value 2b from the SRAM 42 (step S1603). Thereafter, the sub-microcomputer 40 reads out the main microcomputer correction value 2a and the sub-microcomputer correction value 2b from the EEPROM 2 (step S1604) and transmits the main microcomputer correction value 2a to the main microcomputer 30 (step S1605). Moreover, the sub-microcomputer 40 judges whether the sub-microcomputer correction value 2b read out from the SRAM 42 and the sub-microcomputer correction value 2b read out from the EEPROM 2 are consistent with each other (step S1606).

If the sub-microcomputer correction value 2b read out from the SRAM 42 and the sub-microcomputer correction value 2b read out from the EEPROM 2 are not consistent with each other (No in step S1606), the sub-microcomputer 40 writes the correction value read out from the EEPROM 2 in the SRAM 42 to update the correction value stored in the SRAM 42 (step S1607).

When the correction value stored in the SRAM 42 is updated (step S1607) or if the correction value read out from the SRAM 42 and the correction value read out from the EEPROM 2 are consistent with each other (Yes in step S1606), the sub-microcomputer 40 ends the main loop (step S1608). The mail loop indicated in steps S1602 to S1608 is executed repeatedly until the power supply to the ECU 3 is turned off or the sub-microcomputer 40 is restarted.

As described above, in the second embodiment, the main microcomputer correction value 2a and the sub-microcomputer correction value 2b are stored in the SRAMs 32 and 42, respectively, and read out and used as occasion arises. This makes it possible to control occurrence of abnormality in a correction value and actuate the main microcomputer 30 and the sub-microcomputer 40 accurately.

Moreover, a correction value is read out from the EEPROM 2 periodically and compared with a correction value stored in the SRAM. This makes it possible to, even when abnormality occurs in the correction value stored in the SRAM, automatically correct the correction value and perform correction processing using a normal correction value.

Note that the same failsafe processing as the first embodiment can be performed in the second embodiment, and safety in an operation of the ECU 3 can be further improved.

In the first and the second embodiments, the structure in which the ECU includes the two microcomputers is explained. However, the present invention is not limited to this, and a desired number of microcomputers can be provided in the ECU.

In addition, in the first and the second embodiments, the EEPROM is connected to the sub-microcomputer to cause the sub-microcomputer to carry out readout of a correction value from the EEPROM and transmission of the correction value to the main microcomputer. However, for example, it is also possible that the EEPROM is connected to the main microcomputer to cause the main microcomputer to read out a correction value form the EEPROM, and the main microcomputer transmits the correction value to the sub-microcomputer.

Figure 13:
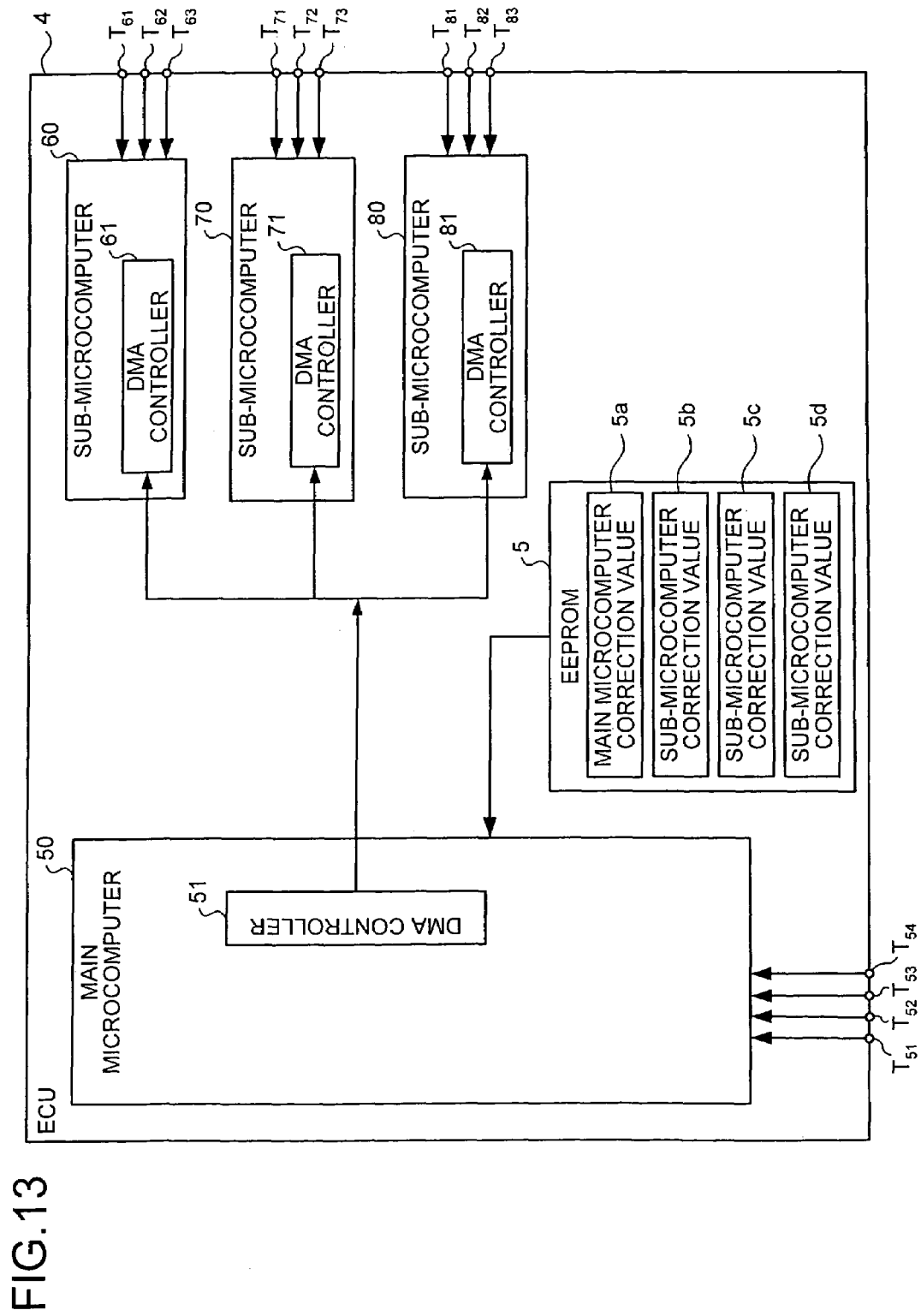
FIG. 13 is a schematic diagram of a schematic structure of an ECU according to a third embodiment of the present invention.

FIG. 13 is a schematic diagram of a schematic structure of an ECU according to a third embodiment of the present invention. An ECU 4 according to the third embodiment includes a main microcomputer 50, sub-microcomputers 60, 70, and 80, and an EEPROM 5.

The main microcomputer 50 is a processing unit that performs processing using analog signals input to input terminals T51 to T54, and the sub-microcomputer 60 is a processing unit that performs processing using analog signals input to input terminals T61 to T63. Similarly, the sub-microcomputers 70 and 80 are processing units that perform processing using analog signals input to input terminals T71 to T73 and input terminals T81 to T83, respectively.

The EEPROM 5 stores a main microcomputer correction value 5a that the main microcomputer 50 uses for correction of an input signal, a sub-microcomputer correction value 5b that the sub-microcomputer 60 uses for correction of an input signal, a sub-microcomputer correction value 5c that the sub-microcomputer 70 uses for correction of an input signal, and a sub-microcomputer correction value 5d that the sub-microcomputer 80 uses for correction of an input signal.

In addition, the main microcomputer 51 includes a DMA controller 51, and the sub-microcomputers 60, 70, and 80 include DMA controllers 61, 71, and 81, respectively. Since other internal structures and operations of the main microcomputer 50 and the sub-microcomputers 60, 70, and 80 are the same as those in the first and the second embodiments, illustrations and explanations of the internal structures and the operations will not be explained here.

The main microcomputer 50 reads out the main microcomputer correction value 5a and the sub-microcomputer correction values 5b to 5d from the EEPROM 5. Thereafter, the main microcomputer 50 corrects an input signal using the main microcomputer correction value 5a and transmits the sub-microcomputer correction values 5b to 5d to the sub-microcomputers 60 to 80 via the DMA controller 51, respectively.

The sub-microcomputer 60 corrects an input signal using the sub-microcomputer correction value 5b that the sub-microcomputer 60 receives via the DMA controller 61. Similarly, the sub-microcomputers 70 and 80 correct input signals using the sub-microcomputer correction values 5c and 5d that the sub-microcomputers 70 and 80 receive via the DMA controllers 71 and 81, respectively.

When three or more microcomputers are mounted on an ECU in this way or even if a main microcomputer reads out a correction value and transmits the correction value to other microcomputers, it is possible to increase speed of startup of the ECU and actuate the ECU accurately and safely.

Note that, in the first to the third embodiments, a correction of an analog voltage of an input signal is explained as an example. However, it is needless to mention that the same effects can also be obtained in correction in an output signal.

Thus, the electronic control unit according to the present invention starts at high speed, operates accurately and safely.

Moreover, the electronic control unit according to the present invention does not malfunction easily, and can automatically recover from a malfunction.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electronic control unit comprising:
a plurality of processing units, including a first processing unit and at least one second processing unit, wherein the first processing unit reads out a correction value from a storage unit and transmits the correction value to the second processing unit, and the first processing unit and the second processing unit correct input and output signals based on the correction value, wherein the first processing unit and the second processing unit respectively include a communication unit that performs reception and transmission of the correction value, wherein
each of the communication units includes
a buffer-for-startup that is used at a time of startup of a corresponding processing unit and stores the correction value at the time of the startup; and
a buffer-for-normal processing that is used after the startup of the processing units and stores the correction value after the startup, wherein the correction value transmitted from the buffer-for-startup of the first processing unit to the buffer-for-startup of the second processing unit is a correction value at the time of startup of the first and second processing units.

2. The electronic control unit according to claim 1, wherein the first processing unit provides a control to start the communication unit of the second processing unit.

3. The electronic control unit according to claim 1, wherein the second processing unit provides a control to start the communication unit of the first processing unit.

4. The electronic control unit according to claim 1, wherein the communication unit of the first processing unit periodically reads out the correction value from the storage unit and transmits the correction value read to the communication unit of the second processing unit.

5. The electronic control unit according to claim 1, wherein the second processing unit provides a control to restart the first processing unit when the correction value received is out of a predetermined range.

6. The electronic control unit according to claim 1, wherein the first processing unit and the second processing unit respectively includes a memory in which a value is stored, and
if the correction value read from the storage unit by the first processing unit is out of a predetermined range, the first processing unit corrects the input and output signals using said value in the corresponding memory, and
if the correction value received by the second processing unit from the first processing unit is out of a predetermined range the second processing unit corrects the input and output signals using said value in the corresponding memory.

7. The electronic control unit according to claim 1, wherein the first processing unit includes a memory in which the correction value read from the storage unit is stored, and the second processing unit includes a memory in which the correction value received from the first processing unit is stored, and
the first processing unit corrects the input and output signals using the correction value held in the corresponding memory at the time of startup, and
the second processing unit corrects the input and output signals using the correction value held in the corresponding memory at the time of startup.

8. The electronic control unit according to claim 7, wherein the first processing unit periodically reads out the correction value from the storage unit and transmits the correction value to the second processing unit, and
when the correction value received is different from the correction value stored in the corresponding memory, the second processing unit updates the correction value stored in the corresponding memory with the correction value received.

9. An electronic control unit comprising:
a plurality of processing units, including a first processing unit and at least one second processing unit, that initialize platform layers and application layers at a time of startup; and
a storage unit that stores a correction value that is used for correcting input and output signals that the processing units uses in initialization of the application layer, wherein
the first processing unit performs initialization processing for the platform layer, reads out the correction value from the storage unit and transmits the correction value read to the second processing unit, and
the second processing unit executes initialization of the platform layer and executes initialization processing for the application layer after being on standby until the correction value is received.

10. The electronic control unit according to claim 9, wherein the second processing unit starts earlier than the first processing unit and sends a startup instruction to the first processing unit.

11. The electronic control unit according to claim 9, wherein the first processing unit periodically reads out the correction value from the storage unit and transmits the correction value read to the second processing unit.

12. The electronic control unit according to claim 9, wherein the second processing unit provides a control to restart the first processing unit when the correction value received is out of a predetermined range.

13. The electronic control unit according to claim 9, wherein the first processing unit and the second processing unit respectively includes a memory in which a value is stored, and
if the correction value read from the storage unit by the first processing unit is out of a predetermined range, the first processing unit corrects the input and output signals using said value in the corresponding memory, and
if the correction value received by the second processing unit from the second processing unit is out of a predetermined range the first processing unit corrects the input and output signals using said value in the corresponding memory.

14. The electronic control unit according to claim 9, wherein the first processing unit includes a memory in which the correction value read from the storage unit is stored, and the second processing unit includes the memory in which the correction value received from the first processing unit is stored, and
the first processing unit corrects the input and output signals using the correction value held in the corresponding memory at the time of startup, and the second processing unit corrects the input and output signals using the correction value held in the corresponding memory at the time of startup.

15. The electronic control unit according to claim 14, wherein the first processing unit periodically reads out the correction value from the storage unit and transmits the correction value to the second processing unit, and when the correction value received is different from the correction value stored in the corresponding memory, the second processing unit updates the correction value stored in the corresponding memory with the correction value received.

* * * * *